May 26, 1953  H. M. GEYER ET AL  2,639,625
MOTOR DRIVEN ACTUATOR
Filed Nov. 28, 1951
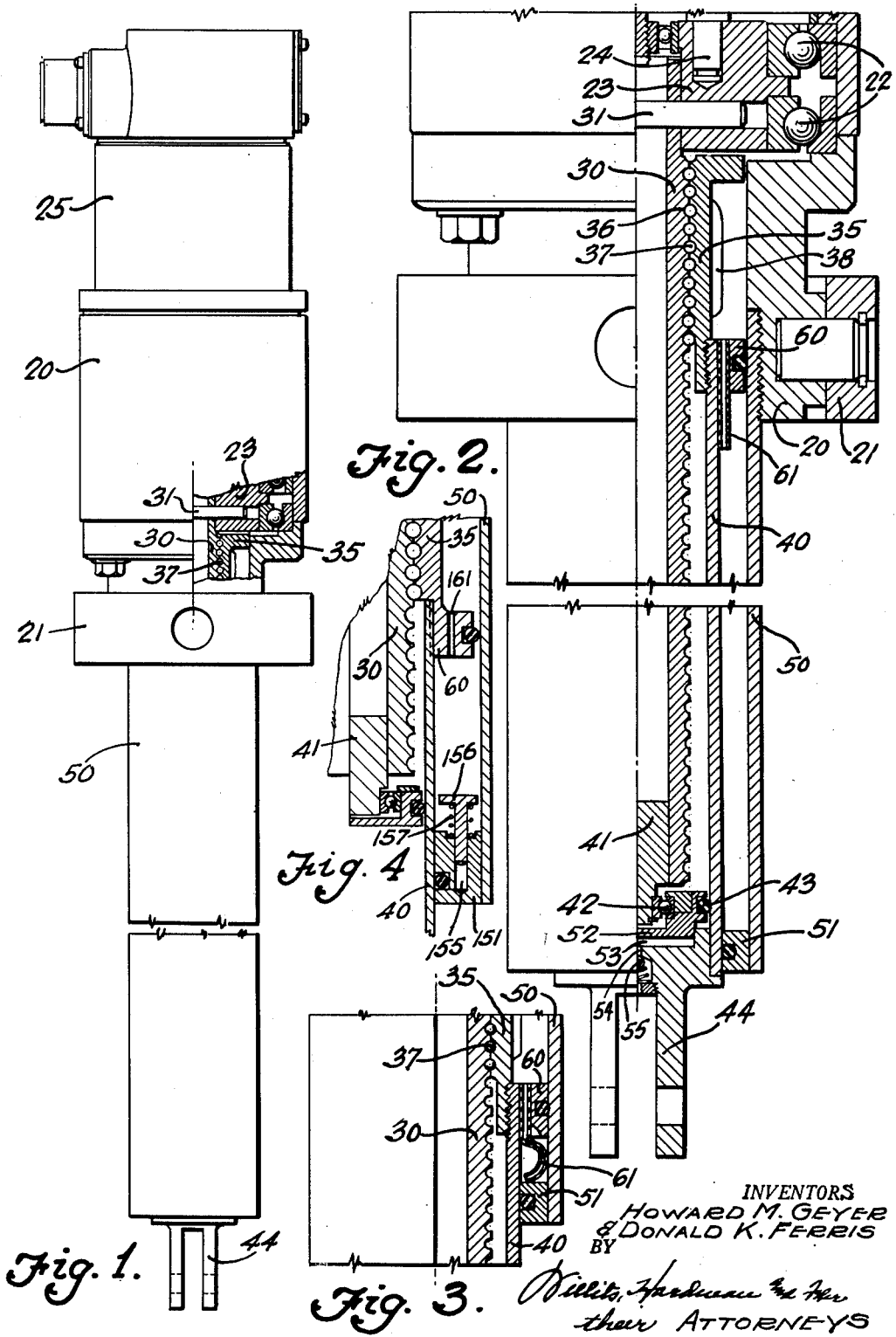
INVENTORS
HOWARD M. GEYER
& DONALD K. FERRIS
BY
their ATTORNEYS Patented May 26, 1953

2,639,625

UNITED STATES PATENT OFFICE 2,639,625

MOTOR DRIVEN ACTUATOR

Howard M. Geyer, Dayton, and Donald K. Ferris, West Milton, Ohio, assignors to General Motors Corporation, Detroit, Mich., a corporation of Delaware Application November 28, 1951, Serial No. 258,636

11 Claims. (Cl. 74—424.8)

This invention relates to an actuator for translating the rotative movements in either direction of one element into reciprocative movement of another element.

It is among the objects of the present invention to provide a motion translating actuator in which telescopically arranged tubular members are relatively moved to extend or retract in response to the rotation of a power device in one direction or the other, respectively.

A further object of the present invention is to provide and arrange sealing bearings between the respective tubular members of the device, said bearings maintaining the several tubes in concentricity and supporting one on the other while stiffening each as the actuator is being extended.

A still further object of the present invention is to provide means operative to regulate the escape of air from a chamber between the two relatively movable tubular members and thereby provide an air cushion for increasingly retarding the movement of the nut during a predetermined final range of actuator extending travel.

Further objects and advantages of the present invention will be apparent from the following description, reference being had to the accompanying drawings wherein a preferred embodiment of the present invention is clearly shown.

In the drawings:

Fig. 1 is an elevational view of an actuator equipped with the present invention;

Fig. 2 is a fragmentary, part-sectional view, at enlarged scale, of a portion of the actuator illustrated in Fig. 1;

Fig. 3 is a fragmentary part-sectional view of a portion of the device illustrated in Fig. 2, shown in a different operating position, however;

Fig. 4 is a fragmentary sectional view of a modified form of air flow control.

The actuator of the present invention is, as has been mentioned, adapted to translate the rotational movement of its driving power device into reciprocatory movement for purposes of extending and retracting or, more specifically, increasing or decreasing the length of the actuator. In this actuator, an electric motor rotates a screw shaft upon which a nut is threadedly supported, said nut having a tubular extension which, in response to reciprocation of the nut as the screw shaft is rotated, extends or retracts the tubular extension of said nut. The actuator comprises a housing 20 provided with means 21 by which it may be secured to any stationary part of the machine to which the actuator is applied. This stationary housing has bearings 22 mounted therein, said bearings rotatably supporting a block 23. This block 23 has a plurality of studs 24 extending into recesses therein, said studs 24 being operatively connected with a power device, shown as an electric motor 25, capable of reverse operation, thus driving the block 23 rotatably in either direction.

A screw shaft 30, shown in the present construction as being tubular, has its one end fitting into a central opening in block 23 and being attached to said block by a cross-pin 31 extending through the shaft and into aligned radial openings in the block 23. This secures the screw shaft 30 to the block 23 so that said screw shaft is rotated by the power device 25, as it operates in one direction or the other. A nut 35 is mechanically connected with the screw shaft 30 so that in response to rotation of the shaft 30, said nut will be reciprocated longitudinally thereon. In the present showing, instead of the ordinary threads, screw shaft 30 is provided with a spiral groove 36 in its outer surface throughout its length extending outside the block 23. The contiguous annular surface of the nut 35 is also provided with a spiral groove coinciding with the spiral groove 36 in the outer peripheral surface of the shaft 30, these two coinciding spiral grooves forming a continuous spiral passage between the shaft and nut which is occupied by a plurality of ball bearings 37. This well known and standard type of connecting a nut to a shaft has the nut provided with a by-pass duct 38 through which the ball bearings travel as they are circulated in the spiral passage in response to rotation of the shaft 30 and longitudinal travel of the nut 35 on said shaft.

The end of the nut 35 most remote from the driving block 23 has one end of an intermediate tube 40 attached thereto in any suitable manner, said intermediate tube extending beyond the end of the screw shaft 30 when the actuator is in fully retracted position, as shown in Fig. 2. A plug 41 is secured in the free end of the tubular screw shaft 30, said plug having a bearing 42 supported thereon, which bearing rotatably carries a piston 52 the outer annular edge of which, being in juxtaposition to the inner annular surface of the intermediate tube 40, has a sealing means 43 which slidably engages said inner surface of tube 40 and substantially prevents leakage at this point. This bearing 42 and piston 52 maintain concentricity between the screw shaft 30 and the intermediate tube 40 and at the same time supports and stiffens said tube 40 as it is extended, or more specifically, moved outwardly of the screw shaft 30 in response to movement of the nut 35 toward the outer end of said screw shaft. A mounting block or clevis 44 is sealingly attached to the outer, free end of the intermediate tube 40 and provides a means whereby this portion of the actuator may be attached to any desirable member of the machine upon which the actuator is mounted. Thus piston 52 and clevis block 44 form a chamber 53 within tube 40 which chamber is gradually enlarged as the nut 35 and its attached tube 40 move outwardly during the actuator extending cycle. Clevis block 44 has an opening 54 normally closed by a spring loaded ball check valve 55 which normally seals said opening against entry of air through said opening into chamber 53 thereby causing a vacuum to be drawn in chamber 53 as the clevis block 44 is moved outwardly, away from piston 52 by the movement of the nut 35 and its tube 40 outwardly of the rotating screw shaft 30. The vacuum drawn in chamber 53 substantially eliminates air displacement which, if present, results in the transfer of moisture laden air from outside the actuator into the interior thereof, said moisture laden air causing eventual rusting and disintegration of the closely operating parts of the actuator.

If the present actuator were to remain unused in its fully extended position for an extended period of time, the vacuum in chamber 53 would be destroyed by the gradual leakage of air into said chamber. To provide for the free discharge of such contained air, spring loaded and normally closed valve 55 is provided which will permit the free exhaustion of the air in chamber 53 on the first retracting cycle of the actuator. This valve tightly closes its passage 54 ordinarily, however, and, due to the vacuum in chamber 53 will not open during the normal retracting cycles of the actuator.

The outer shell or casing 50 is a tube concentric of the shaft and intermediate tube, having its one end attached within a recess in the housing 20. This outer casing 50 has a sealing bearing 51 attached in its outer, free end, said bearing sealingly and slidingly engaging the outer surface of the intermediate tube 40. At the end of the intermediate tube 40, attached to the nut 35, there is provided a sealing bearing 60 secured to the tube 40 in any suitable manner and slidably engaging the inner annular surface of the outer tube or casing 50. This bearing 60 has a through passage in which in one construction as shown in Fig. 2, a flexible pipe 61 is secured, the inner diameter of this pipe 61 being of a predetermined size so as to restrict the transfer of air therethrough to a predetermined degree. The pipe extends from bearing 60 into the chamber between tubes 40 and 50 a predetermined length so that when the movement of the nut 35 toward the bearing 42 has reached a predetermined point, said flexible pipe 61 will engage the bearing 51. Continued movement of said nut on its actuator extending travel causes the pipe 61 to be flexed as shown in Fig. 3, thereby kinking said pipe and shutting off the air-flow therethrough. The air trapped in the said chamber between the two bearings 60 and 51, as shown in Fig. 3, will form an air-cushion which gradually retards this movement of the nut and thereby prevents damaging engagement with the bearing 42.

Thus, when the electric motor rotates the shaft 30 in one direction, the nut 35 will be caused to move longitudinally of said shaft, outwardly, to extend the length of the actuator by moving the intermediate tubular member 40 outwardly of the casing 50. Reverse rotation of the electric motor 25 will reverse the rotation of the screw shaft 30, resulting in a retractive movement of the actuator as the nut 35 moves inwardly of the shaft 30 toward its driving block 23 and thus drawing or retracting the tube 40 into the confines of the actuator casing 50.

The provision of the bearings 42, 51 and 60 and their particular arrangement maintain the three concentrically arranged and telescopically movable tubular members 30, 40 and 50 in constant concentricity and also provide support areas between them which stiffen them substantially, especially while the actuator is being moved toward its extended position.

The flexible tube 61 maintains a predetermined restriction on the escape of air from the annular chamber between tubular members 40 and 50 as the nut 35 moves outwardly of the shaft 30, thereby controlling the extending movement of the actuator, said tube 61, when engaged and kinked by the bearing 51, forming an air-trap which cushions the final movement of the nut 35 outwardly of the shaft 30 and thereby prevents damaging contact of the nut with the bearing 42.

Fig. 4 illustrates a modified form of air discharge control. Here the sealing bearing 60 has a predeterminately sized through passage 161 which restricts the air discharge through said bearing as it is moved outwardly of tube 50 by nut 35. The sealing bearing 151 attached to tube 50 and slidably engaging the intermediate tube 40 has a recess 155 in which the stem of the valve 156 is slidably supported. A spring 157 interposed between valve 156 and bearing 151 holds said valve 156 in predetermined spaced relation with said bearing so that when the nut 35 and its associated bearing 60 reaches a predetermined point in its approaching movement toward bearing 151, valve 156 will be engaged by bearing 60 and its through passage 161 closed so as to prevent the exhausting of air through said passage and thus to set up an air cushion which will retard movement of the bearing 60 and prevent damaging contact or bottoming thereof on the bearing 151.

While the embodiment of the present invention as herein disclosed, constitutes a preferred form, it is to be understood that other forms might be adopted.

What is claimed is as follows:

1. An actuator comprising in combination, a housing; a screw shaft rotatably supported within said housing; reversible power means carried by the housing and operatively connected to the screw shaft for rotating it; a non-rotatable nut operatively connected to the screw shaft, said nut having a tubular extension encompassing the screw shaft; a tubular casing spaced from and surrounding the tubular extension of the nut; sealing rings inside the casing at each end thereof, one ring being movable with the nut and slidably engaging the casing, the other ring being attached to the casing and slidably engaging the nut extension; an air flow orifice of predetermined flow capacity in said one ring; and control means operative at a predetermined point in the movement of the one ring toward said other ring, for closing said orifice to form an air cushion between the casing and the nut extension.

2. An actuator comprising in combination, a housing; a screw shaft rotatably supported within said housing; reversible power means carried by the housing and operatively connected to the screw shaft for rotating it; a non-rotatable nut operatively connected to the screw shaft, said nut having a tubular extension encompassing the screw shaft; a tubular casing spaced from and surrounding the tubular extension of the nut; sealing rings inside the casing at each end thereof, one ring being movable with the nut and slidably engaging the casing, the other ring being attached to the casing and slidably engaging the nut extension; an air flow orifice of predetermined flow capacity in said one ring; said orifice being provided by a flexible tube extending through the one ring and depending therefrom a predetermined distance into the space between the casing and nut extension, the tube engaging the said other ring and being kinked when said first ring reaches a predetermined point in its approach toward the second ring, for shutting off the orifice.

3. An actuator comprising in combination, a housing; a screw shaft rotatably supported within said housing; reversible power means carried by the housing and operatively connected to the screw shaft for rotating it; a non-rotatable nut operatively connected to the screw shaft, said nut having a tubular extension encompassing the screw shaft; a tubular casing spaced from and surrounding the tubular extension of the nut; sealing rings inside the casing at each end thereof, one ring being movable with the nut and slidably engaging the casing, the other ring being attached to the casing and slidably engaging the nut extension; an air flow orifice of predetermined flow capacity in said one ring; and control means operative at a predetermined point in the movement of the one ring toward said other ring, for closing said orifice to form an air cushion between the casing and the nut extension, said control means consisting of a spring loaded valve movably carried by said other ring and yieldably held in predetermined spaced relation thereto, said valve being engageable by the said one ring for closing the orifice therein and forming an air cushion within the casing.

4. An actuator comprising in combination, a housing; a member rotatably supported within the housing; power means connected to said member for rotating it in either direction; a screw shaft having one end attached to the member so as to be rotated thereby; a non-rotatable nut on said screw shaft; a tube secured to the nut and surrounding the screw shaft, said tube having a closure member attached to its free end; a solid partition in the tube slidably and sealingly engaging the tube and rotatably attached to the screw shaft, said partition forming a substantially air tight chamber in the tube at its closure end; a cylindrical shell surrounding the tube, one end of the shell being attached to the housing; a bearing collar movable with the nut and slidably, sealingly engaging the shell; and another bearing collar attached within the shell at its free end and slidably sealingly engaging the tube.

5. A device in accordance with claim 4 in which the housing and its attached shell form an annular chamber about the nut and its attached tube, and in which the bearing collar movable with the nut and slidably engaging the shell is provided with a passage of predetermined diameter, operative to restrict the transfer of air from one side of said bearing to the other in response to movement of the nut and its attached tube longitudinally of the shell.

6. A device in accordance with claim 4 in which the housing and its attached shell are concentrically spaced from the nut and its attached tube to form an annular chamber around the nut and tube, the bearing collar, movable with the nut and slidable in the shell having a through passage in which a flexible air restricting tube is fastened, said tube having a predetermined air flow capacity and predeterminately extending from its supporting bearing toward the bearing secured to the shell and slidable on the tube, whereby said flexible tube engages and is kinked by said bearing secured to the shell when the nut reaches a predetermined point in its travel toward the flexible tube engaged bearing, the kinked tube preventing escape of air from the annular chamber portion into which it extends and thereby providing an air cushion for the nut.

7. An actuator comprising in combination, a housing; a screw shaft rotatably supported within said housing; reversible power means carried by the housing and operatively connected to the screw shaft for rotating it; a non-rotatable nut operatively connected to the screw shaft, said nut having a tubular extension encompassing the screw shaft; a tubular casing spaced from and surrounding the tubular extension of the nut; sealing rings inside the casing at each end thereof; one ring being movable with the nut and slidably engaging the casing, the other ring being attached to the casing and slidably engaging the nut extension; an air flow orifice of predetermined flow capacity in said one ring; and an orifice closing member, carried by the said other ring and yieldably held in predetermined spaced relation thereto, said member being engageable by the said one ring when it is moved by the nut toward said other ring.

8. An actuator comprising in combination, a housing; a member rotatably supported within the housing; power means connected to said member for rotating it in either direction; a screw shaft having one end attached to the member so as to be rotated thereby; a non-rotatable nut on said screw shaft; a tube secured to the nut and surrounding the screw shaft, said tube having a closure member attached to its free end; a solid partition in the tube slidably and sealingly engaging the tube and rotatably attached to the screw shaft, said partition forming a chamber in said tube at its closure end; an orifice in the said closure member, normally closed by a fluid flow control valve, said valve being operative in response to movement of the nut in one direction, to open said orifice; a cylindrical shell surrounding the tube, one end of the shell being attached to the housing; a bearing collar movable with the nut and slidably, sealingly engaging the shell; and another bearing collar attached within the shell at its free end and slidably sealingly engaging the tube.

9. An actuator comprising in combination, a housing; a member rotatably supported within the housing; power means connected to said member for rotating it in either direction; a screw shaft having one end attached to the member so as to be rotated thereby; a non-rotatable nut on said screw shaft; a tube secured to the nut and surrounding the screw shaft, said tube having a closure member attached to its free end; a piston slidably and sealingly engaging the tube, said piston being attached to the screw shaft so as to be immovable longitudinally of the shaft but the shaft being rotatable relatively to the piston which forms a chamber in said tube adjacent its closure member; an orifice in said closure member normally closed by a check valve which is operative in response to movement of the nut in one direction, to open said orifice; a cylindrical shell surrounding the tube, one end of the shell being attached to the housing; a bearing collar movable with the nut and slidably, sealingly engaging the shell; and another bearing collar attached within the shell at its free end and slidably sealingly engaging the tube.

10. An actuator comprising in combination, a housing, a member rotatably supported within said housing, power means carried by the housing and operatively connected to said member for rotating it in either direction, a non-rotatable element operatively engaging said member so as to move lineally in response to rotation of the member, said element having a tubular extension encompassing said member, a tubular casing spaced from and circumscribing the tubular extension of said element, sealing rings inside the casing adjacent each end thereof, one ring being movable with the element and slidably engaging the casing, the other ring being attached to the casing and slidably engaging the extension of said element, an air flow orifice of predetermined flow capacity in said one ring, and closure means operative at a predetermined point in the movement of said one ring toward said other ring, to prevent the flow of air through said orifice to thereby form an air cushion between the casing and the extension of said element.

11. An actuator comprising in combination, a housing, a member rotatably supported within the housing, power means carried by said housing and operatively connected to said member for rotating it in either direction, a non-rotatable element operatively engaging said member so as to move lineally in response to rotation of said member, a tube secured to the element and surrounding the member, said tube having a closure plate attached to its free end, a solid partition in the tube slidably and sealingly engaging the tube and rotatably attached to said member, said partition forming a substantially air-tight chamber in the tube at its closure end, a shell surrounding the tube, one end of the shell being attached to the housing, sealing means movable with the element and slidably engaging the shell, and sealing means attached within the shell at its free end and slidably engaging the tube.

HOWARD M. GEYER.
DONALD K. FERRIS.

References Cited in the file of this patent
UNITED STATES PATENTS

| Number | Name | Date |
|---|---|---|
| 2,394,384 | Horstman | Feb. 5, 1946 |
| 2,409,288 | Leland | Oct. 15, 1946 |